United States Patent [19]

Takeuchi et al.

[11] Patent Number: 4,533,584
[45] Date of Patent: Aug. 6, 1985

[54] MULTI-CHANNEL BODY

[75] Inventors: Yukihisa Takeuchi; Tadashi Fujita, both of Nagoya, Japan

[73] Assignee: NGK Insulators, Ltd., Japan

[21] Appl. No.: 596,103

[22] Filed: Apr. 2, 1984

[30] Foreign Application Priority Data

Apr. 5, 1983 [JP] Japan .................. 58-58752

[51] Int. Cl.$^3$ .............................................. B32B 3/12
[52] U.S. Cl. ..................................... 428/116; 422/180; 428/118; 428/188; 502/527
[58] Field of Search ............... 428/116, 117, 118, 188; 55/523, 529; 422/180, 222; 502/527

[56] References Cited

U.S. PATENT DOCUMENTS

| | | | |
|---|---|---|---|
| 3,679,384 | 7/1972 | Colson et al. | 428/116 X |
| 3,790,654 | 2/1974 | Bagley | 428/116 X |
| 3,824,196 | 7/1974 | Benbow et al. | 428/116 X |
| 3,963,504 | 6/1976 | Lundsager | 428/116 X |
| 3,995,143 | 11/1976 | Hervert | 428/116 X |
| 4,253,992 | 3/1981 | Soejima et al. | 428/116 X |
| 4,271,110 | 6/1981 | Minjolle | 264/67 |
| 4,294,806 | 10/1981 | Abe et al. | 502/527 X |
| 4,416,676 | 11/1983 | Montierth | 422/180 X |
| 4,420,316 | 12/1983 | Frost et al. | 422/180 X |
| 4,448,833 | 5/1984 | Yamaguchi et al. | 428/188 X |

FOREIGN PATENT DOCUMENTS 1020153 1/1977 Canada .
1459812 12/1976 United Kingdom .

Primary Examiner—Henry F. Epstein
Attorney, Agent, or Firm—Parkhurst & Oliff

[57] ABSTRACT

A multi-channel body having excellent heat exchanging effectiveness, gas separating effectiveness and high thermal shock resistance is characterized in that a large number of channels are formed independently by being surrounded with partition walls, said partition walls are connected with partition walls surrounding other independent channels, continuous channels are formed with the partition walls, outer wall and the connecting walls around each channel, and a part of said continuous passages open outward the outer wall and a side face of said continuous passage is integrally and air-tightly sealed with the outer wall at at least one end face where the channels open.

7 Claims, 17 Drawing Figures

FIG_4
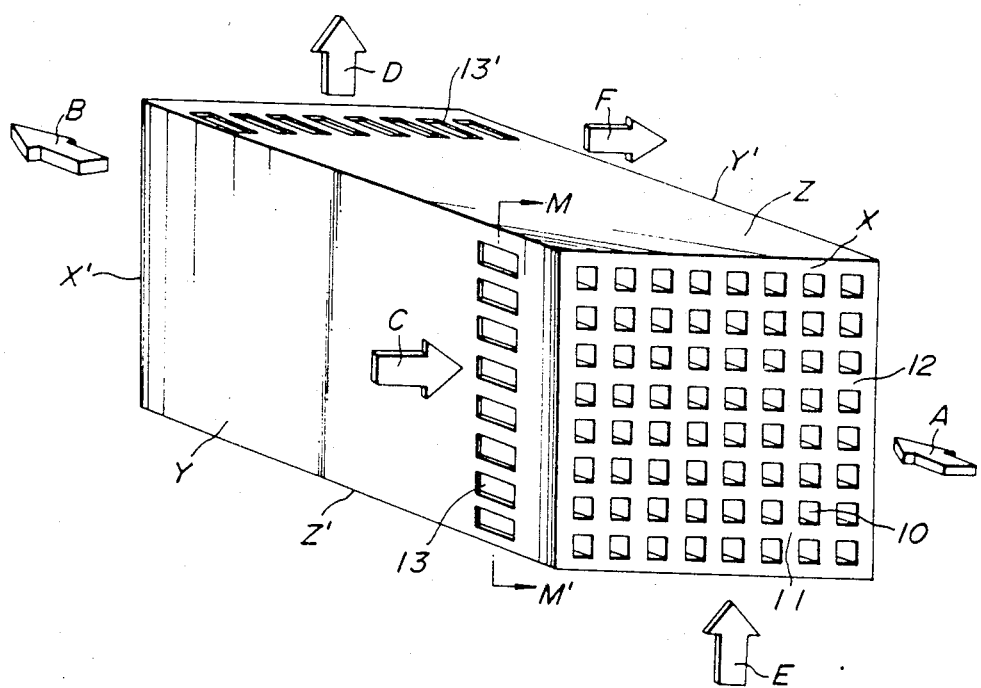
FIG_5
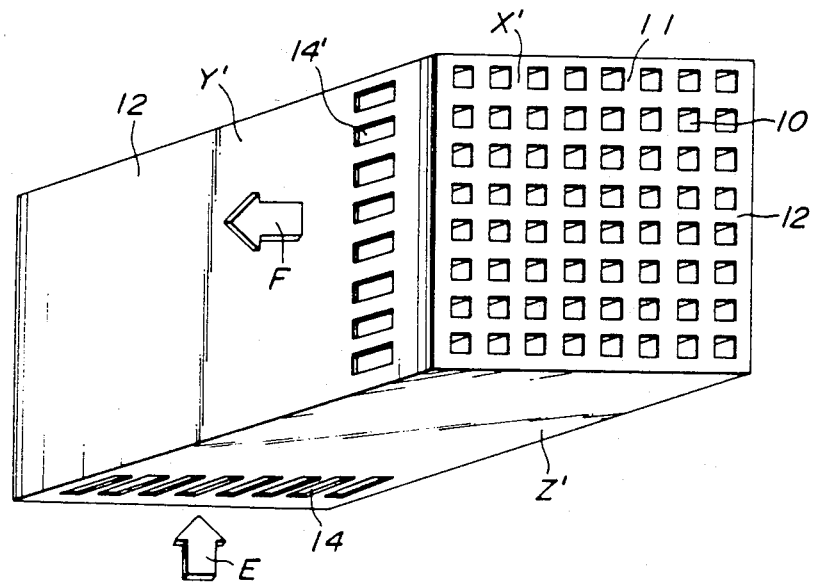

FIG_7

FIG_8

FIG_11
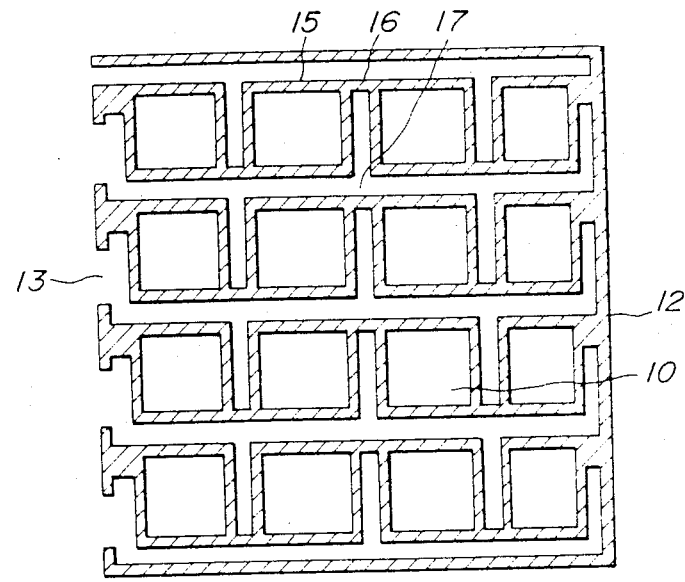
FIG_12
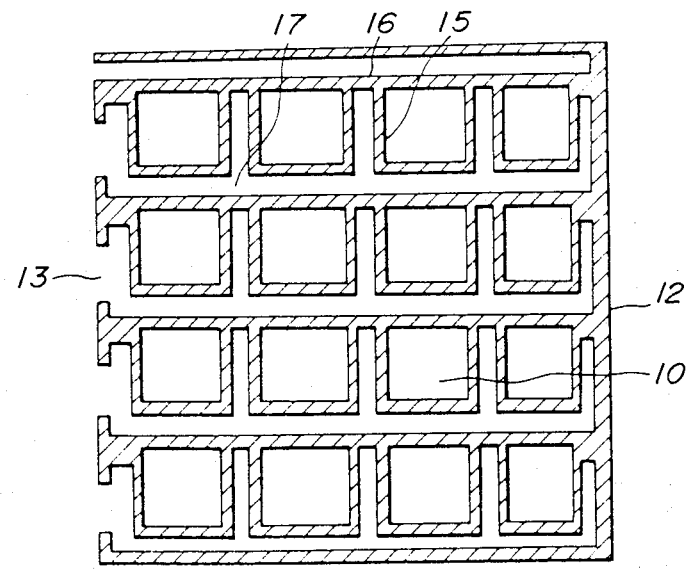

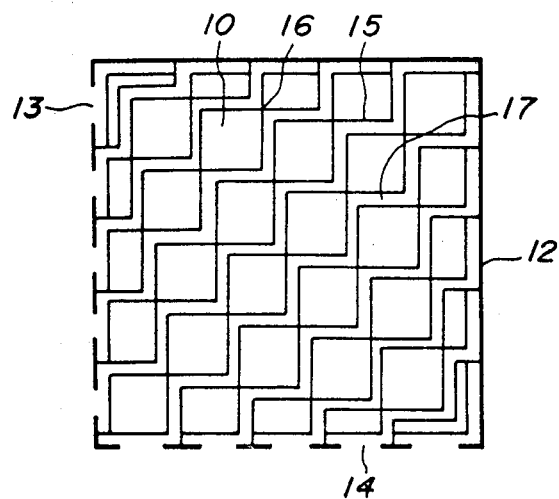
FIG_15
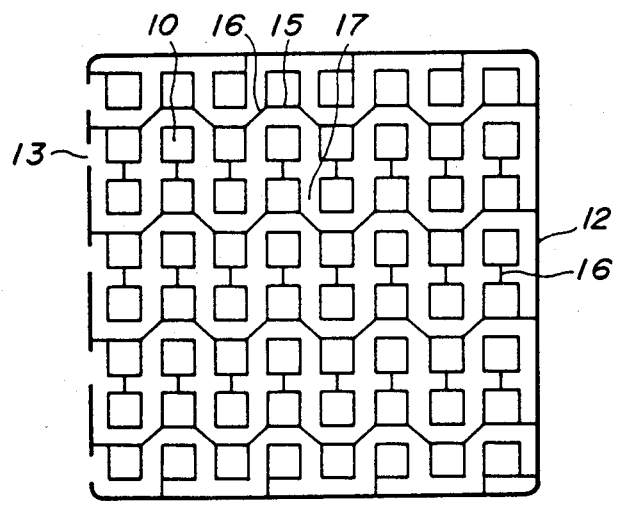
FIG_16

FIG_17
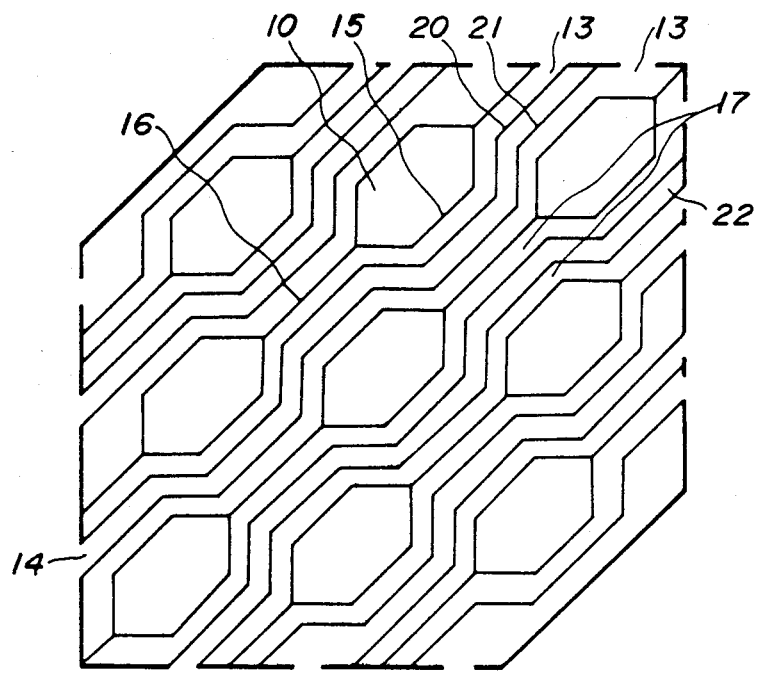

MULTI-CHANNEL BODY

BACKGROUND OF THE INVENTION

1. Field of the Invention

The present invention relates to a multi-channel body having a large number of passages for flowing fluids therethrough and more particularly to a multi-channel body which is highly effective as a heat exchanger, filtrating device, permeator, separating membrane, filter, cooler, catalyst support, various reactors, package and the like. This multi-channel body has excellent heat transfer properties, mass transfer properties and the like, because the entire circumference of the partition walls which form independent channels acts as a contacting area between different fluids.

2. Description of the Prior Art

Heretofore, the multi-channel bodies having a honeycomb structure have been broadly known as described in for example, Japanese Patent Laid Open Application No. 42,386/1972. These multi-channel bodies composed of a honeycomb structure are provided with a large number of parallel channels 1 having a cross-sectional shape of polygons, such as triangular, tetragonal, hexagonal etc. or circular, which are formed by continuous partition walls 2 composed of a ceramic material, such as alumina, mullite, cordierite and the like as shown in FIG. 1 of said prior art. When such a multi-channel body is used for a heat exchanger as described in Japanese Patent Laid Open Application No. 84,448/1976 or 102,891/1980, a structure in which alternate rows of channels 1' are air-tightly sealed at an end face 3 where the channels 1 are opened and the end portions of the sealed channels 1' are communicated to openings 5 provided at a face perpendicularly intersected with the above described end face 3.

However, in the heat exchanger using such a honeycomb structured multi-channel body, as shown in FIG. 2, even when a heat transfer medium (referred to as "hot fluid" hereinafter) having a high temperature is flowed into channels 1 opened at one end face 3 as shown in arrows A and B and a fluid having a low temperature (referred to as "cool fluid" hereinafter) to which the heat is transmitted, is flowed into channels 1' communicating from openings 5 on a face 4 perpendicularly intersected with the end face 3 to openings 5' on another face 4 as shown by arrows C and D. FIG. 3 shows schematically the cross-section of the channels 1 and 1' and the heat transfer of the hot fluid flowing in the channels 1 is highly effected to partition walls 2 toward the channels 1' flowing the cool fluid, that is in the direction of the arrows a and b and the heat is transmitted from the hot fluid in the channels 1 to the cool fluid in the channels 1', but is not substantially transmitted to the direction of the adjacent channels 1 flowing the same hot fluid, that is to the direction of the arrows c and d. Thus, in the prior honeycomb structured multi-channel body wherein the cross-sectional shape of the channels 1 is tetragonal as shown in FIGS. 1–3, the heat of the hot fluid flowing in the channels 1 is transmitted only to two sides among four sides of partition walls, that is to the direction of the arrows a and b and the heat to the direction of the arrows c and d is not used at all for the heat exchange.

Namely, in the prior honeycomb structured multi-channel body, only some of the partition walls 2 surrounding the channels 1 are utilized for heat transfer, so that the contact area between the passage for flowing the hot fluid and the passage for flowing the cool fluid is small and the heat exchanging effectiveness is low.

Furthermore, even when the prior multi-channel body is used as a gas separating membrane, filtrating device and the like, only some of the partition walls surrounding the channels 1 are utilized, so that the contact area between the channels 1 and the channels 1' is small and the effectiveness is low, and the adjacent channels 1 and 1' commonly possess partition walls 2, so that such a multi-channel body does not have much flexibility in its structure and the structure has a poor thermal shock resistance.

SUMMARY OF THE INVENTION

The present invention has been made for obviating these drawbacks of the prior multi-channel bodies and aims to provide multi-channel bodies in which all the partition walls surrounding the channels of the multi-channel body are utilized as the contacting face for heat transfer heat or mass transfer, thereby increasing the contact area between the passages where different fluids flow and unexpectedly improving the heat exchanging effectiveness, the separating effectiveness and the like.

Another object of the present invention is to provide multi-channel bodies having a more flexible structure and greater thermal shock resistance than known structure by making the channels in independent structure, whereby the partition walls surrounding each channel are made independent, and connecting the partition walls with connecting walls.

The present invention lies in a multi-channel body which comprises a large number of independent channels surrounded by partition walls; said partition walls defining each independent channel being connected with the partition wall of the other adjacent independent channel or an outer wall by a connecting wall; continuous passages defined and formed around each channel by the above described partition walls, outer wall and connecting walls; and some of said continuous passages being opened outward the outer wall and a side face of said continuous passage being integrally and air-tightly sealed with the outer wall at at least one end face where the channels are opened.

BRIEF DESCRIPTION OF THE DRAWINGS

FIG. 4 and FIG. 5 are schematic views showing appearance of one embodiment of multi-channel body of the present invention;

FIGS. 10–17 are diagrammatic views showing the cross-section of other different embodiments of multi-channel bodies of the present invention.

DESCRIPTION OF THE PREFERRED EMBODIMENTS

Figure 1:
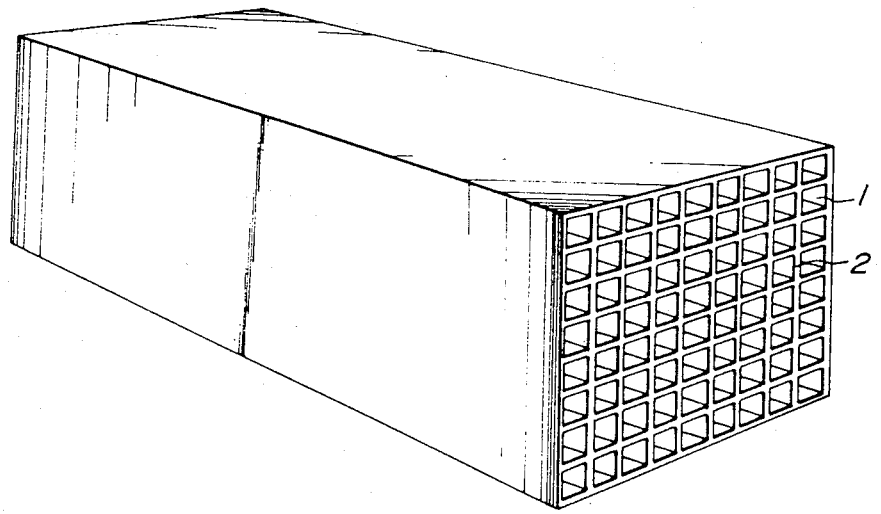
FIG. 1 is a perspective view of one embodiment of a prior honeycomb structured multi-channel body.

The construction of the multi-channel body according to the present invention will be explained in more detail with reference to the attached drawings.

FIGS. 4 and 5 display one embodiment of a multi-channel body according to the present invention. As shown in FIGS. 4 and 5, passages of a large number of independent channels 10 penetrate through from an end face X of the multi-channel body toward another end face X' and the portion 11 other than the channels 10 in the end faces X and X' is integrally and air-tightly connected and sealed with an outer wall 12. On a face Y different from the end faces X and X', there is an opening 13 which opens outward the outer wall 12 and on a face Z there are openings 13', on a face Y' there are openings 14' and on a face Z' there are openings 14.

For example, when the multi-channel body shown in FIGS. 4 and 5 is used as a heat exchanger, a hot fluid is flowed into the openings of the channels 10 provided in a large number on the end face X as shown by an arrow A and is flowed out toward an arrow B. On the other hand, a cool fluid, which is intended to be heat-exchanged, is flowed from the openings 13 on the face Y to the openings 13' on the face Z, similarly from the openings 14 on the face Z' to the openings 14' on the face Y' as shown by the arrows C, D, E and F to effect the heat exchange with the hot fluid. A cross-section along line M—M' of the multi-channel shown in FIG. 4 is shown in FIG. 6.

Figure 6:
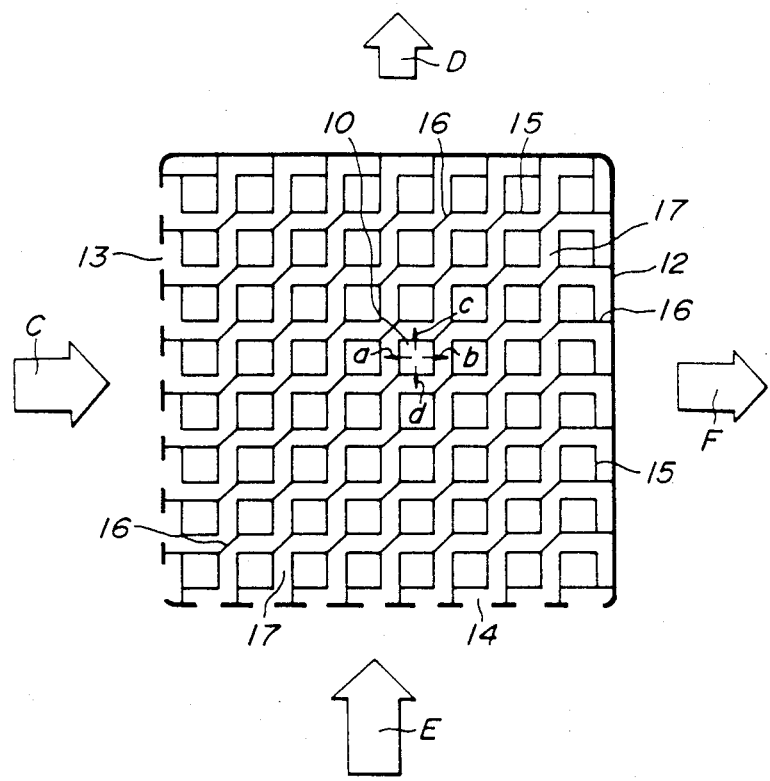
FIG. 6 is a diagrammatic view showing a cross-section along the line M—M' in FIG. 4.

As shown in FIG. 6, a large number of channels 10, which open in the end face X of FIG. 4, are independent channels surrounded by partition walls, respectively, with the partition walls 15 defining the independent channels 10 being connected to the partition walls of other adjacent independent channels 10 with connecting walls 16 and similarly the partition walls 15 being connected to the outer wall 12 with the connecting walls 16. As the results, the circumference of each channel 10 defines and forms a continuous passage 17 with the partition walls 15, the out wall 12 and the connecting walls 16, and the passages 17 are connected to the openings 13, 13', 14 and 14' and open outward the outer wall 12.

Figure 7:
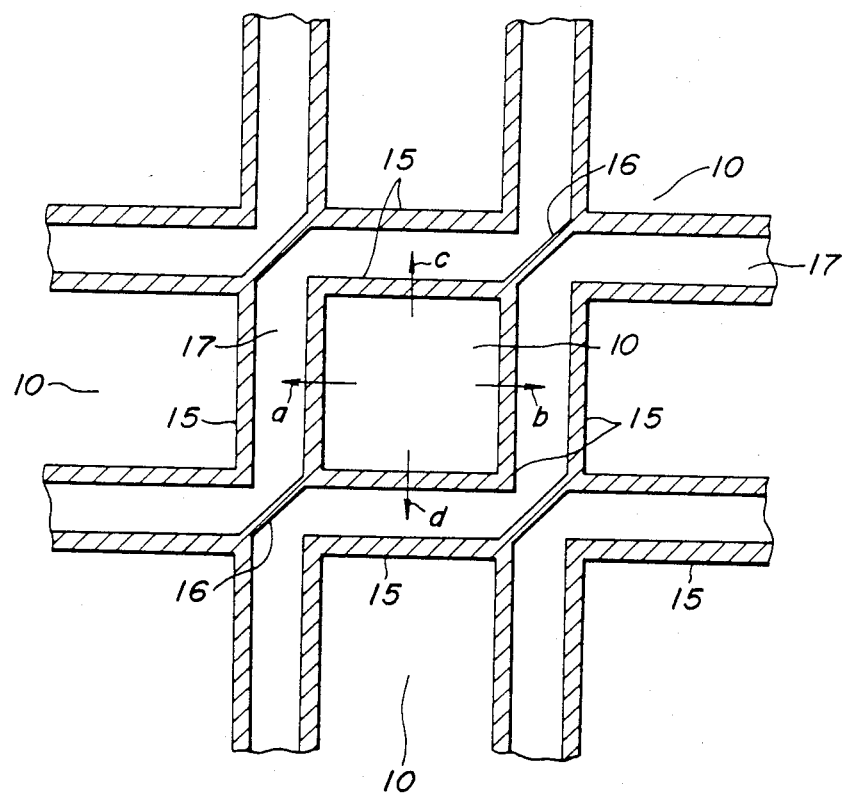
FIG. 7 is a partially enlarged cross-sectional view of FIG. 6.

Thus, as shown in FIG. 7, in the multi-channel body of the present invention, all four sides a, b, c and d of the partition wall 15 surrounding the independent channel 10 are contacted with the passages 17. When the multi-channel body is used as a heat exchanger, the heat transfer area or contacting area is twice as large as the heat transfer area in the prior multi-channel body shown in FIG. 2. Therefore, the heat exchanging effectiveness and gas separating effectiveness are noticeably improved.

In the multi-channel body of the present invention, the channels 10 are independent respectively and the partition walls 15 defining and forming each channel 10 are independent from adjacent channels 10 because adjacent channels 10 do not have any common partition wall 15 between them and the independent partition walls 15 are connected to the connecting walls 16. Thus, any deformation due to the heat stress can be suppressed and a thermally flexible structure can be obtained.

In the multi-channel body shown in FIG. 4, the walls 16 connecting the partition wall 15 with the partition wall 15 are arranged symmetrically with respect to the channels 10, as shown in FIGS. 6–7, but such an arrangement is not always necessary. In FIGS. 4 and 5, the openings of the continuous passages 17 around each channel 10 are provided at four portions 13, 13', 14 and 14' but the openings of the passages 17 may be only the openings 13 and 14.

Figure 8:
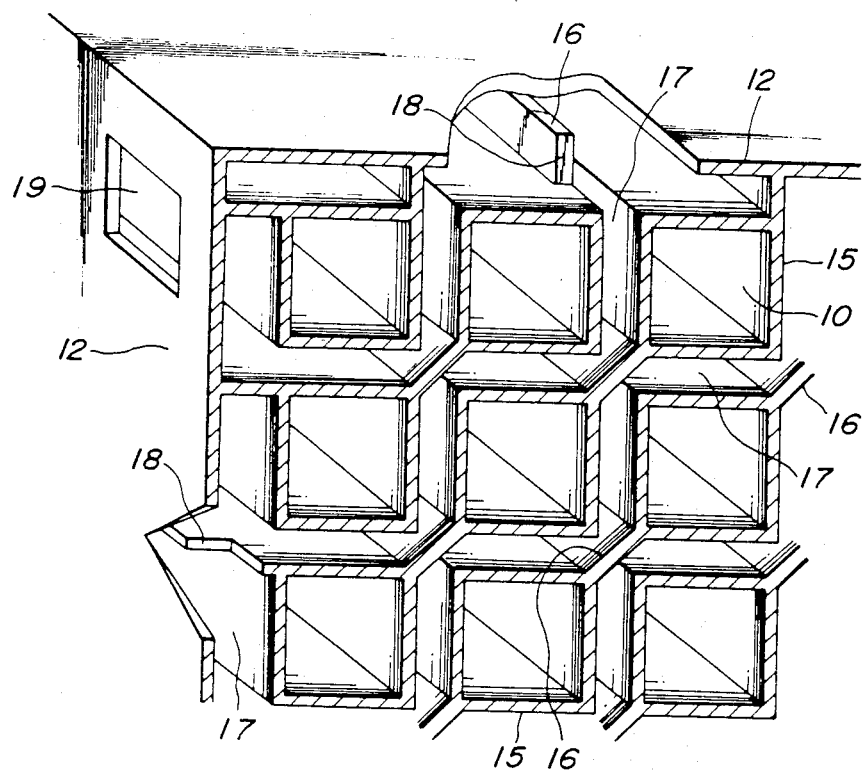
FIG. 8 and FIG. 9 are diagrammatic views showing transverse cross-sections of embodiments of different multi-channel bodies of the present invention.
Figure 9:
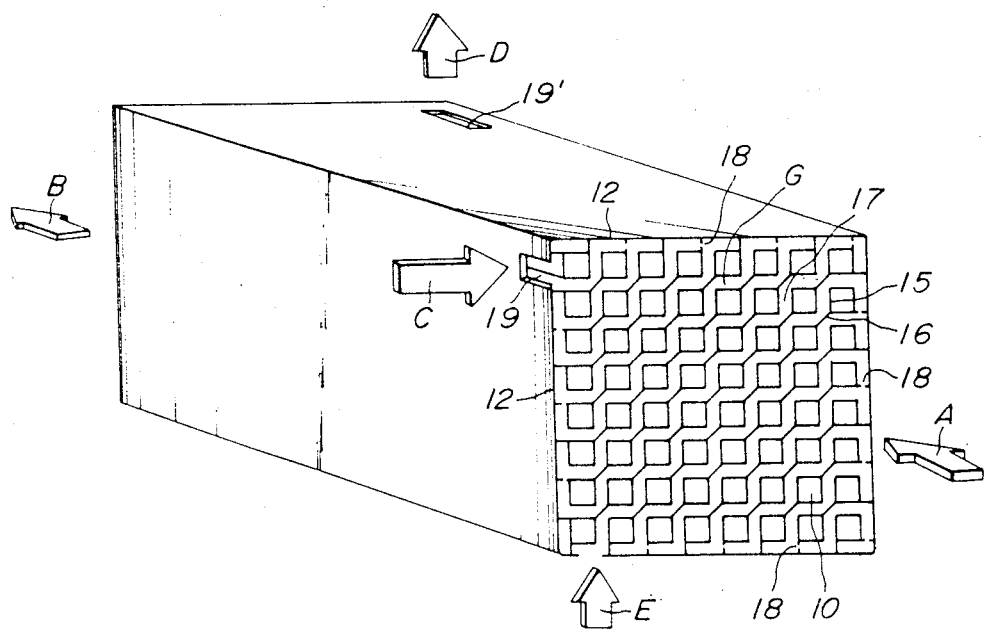
Figure 10:
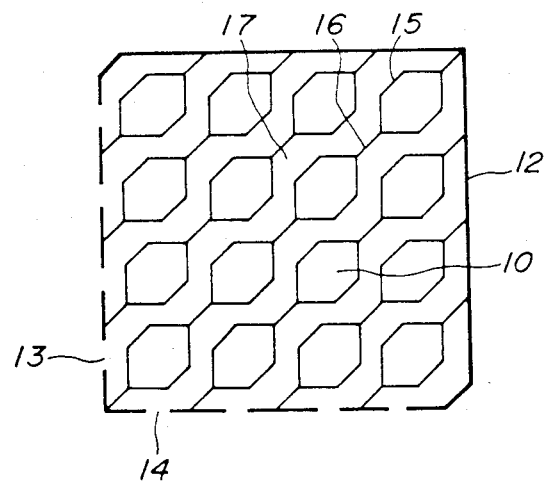

In the multi-channel body shown in FIGS. 4–7, communicating portions 18, as shown in FIG. 8, may be provided on a part of the wall 16 connecting to the outer wall 12 to communicate the passages 17. For example, if the communicating portions 18 are provided at several portions in the outer circumference as shown in FIG. 9, the number of openings, 13 and 13' shown in FIG. 4, may be reduced to the openings 19 and 19'. A plurality of openings 13 and 13' in FIG. 4 or 5 are provided but this plurality of openings may be reduced to one opening (not shown). Even in the same cross-sectional shape, the flow way of the passages 17 may be freely selected according to the means for connecting the channels and the manner for arranging the communicating portions of the connecting walls.

In the multi-channel body of the present invention, by integrally connecting and air-tightly sealing either one of the end portions of the channel 10 with the outer wall 12, a component flowed from the opened end portion of the channel 10 may be filtered and the filtered fluid is obtained from the opening connected to the continuous passage 17 around the channel. Alternatively, the fluid filtered through the partition walls may be obtained from a side face of the passage 17 without air-tight sealing of the side face of the continuous passage 17 positioning the end face of the multi-channel body at which one end of the channel 10 is sealed. The multi-channel body may be of various structures according to the cross-sectional shape of the channel 10 and the manner how the opening of the continuous passage 17 around the channels 10 is provided on the outer wall 12.

If the various embodiments of the multi-channel bodies of the present invention are shown by the cross-sectional view corresponding to FIG. 6, they may be shown by FIGS. 10–17.

In FIG. 15, the connecting wall 16 is present as an intersecting point of the partition walls 15 of the independent channel 10.

In FIG. 17, different partition walls 20 and 21 are provided in the continuous passage 17 to form a passage 22 held between the passages 17. In this manner, the multi-channel body of the present invention may be constructed by dividing the flow way of the passage 17 by means of the partition walls 20 and 21.

The multi-channel bodies may be used in a combination of two or more in series or parallel.

As a material forming the multi-channel bodies of the present invention, a dense material, a vapor permeable material or a water permeable material may be selected according to the use but practically, metallic, ceramic, glass, plastic material or the like or a combination thereof is preferable.

Among them, inorganic materials, such as cement, refractory material, ceramics, glass or a carbonaceous material or a metallic material is preferable and the inorganic materials include carbon, mullite, cordierite, silica, zircon, silica-alumina, silimanite, zirconia, zircon mullite, spinel, zirconia-spinel, titania, alumina, clay, beryllia, alumina-titanate, mullite-aluminatitanate, magnesia-aluminatitanate, zeolite, Vicor glass, silicon carbide, silicon nitride, $LaCoO_3$, La-Sr-CoO$_3$, Sr-Ce-Y-O, Sr-Ce-Zn-O, $BaTiO_3$, GaAs, $ZrO_2$-CaO, ZnO, $SnO_2$, $Fe_2O_3$, $LiNbO_3$, $SrTiO_3$, $PbO-ZrO_2-TiO_2$, $LiTaO_3$, $LaCrO_3$, GaP, CBN, ZrC, $ZrO_2-Y_2O_3$, TiC, TaC, GaAsP, $LaB_6$, etc., and combinations thereof. Metallic materials include aluminum, copper, iron and the like. These materials are relatively easily extrusion-shaped to produce the monolithical multi-channel bodies of the present invention.

The cross-sectional shape of the channels of the multi-channel bodies of the present invention may be any shape but particularly circular, ovular, triangular, tetragonal, pentagonal and hexagonal are preferred.

The connecting portion of the partition walls surrounding each channel with the connecting wall may be freely selected but it is preferable to provide said portion at a position of point or line symmetry with respect to the channel in view of the strength, the easiness of designing of the continuous passage, and other similar considerations. In addition, it is preferable that the wall thickness of the partition walls surrounding each channel is uniform, but it is acceptable for the wall thickness of the outer wall to be larger. Furthermore, it is preferable that the axial line of each of the large number of independent channels is parallel, because the thickness of the partition walls forming the channels is uniform, so that the pressure loss, filtration area, heat conducting area and the like are uniform in each channel. The term "parallel" used herein means that the axial lines of the channels are parallel in the three dimensional Euclid space, that is when the channels are in zigzag line, parallel includes a case where the curved channels are parallel.

As materials to be used for the air-tightly sealed portion, a ceramic paste, ceramic cement, ceramic sheet, metal, glass, silicone rubber, plastics and the like are preferable.

The following examples are given for the purpose of illustration of this invention and are not intended as limitations thereof.

EXAMPLE 1

Cordierite raw material was added with water and a shaping aid, such as methyl cellulose, etc., a surfactant and the like to prepare a mixture. The mixture was kneaded with a kneader to obtain a shaping raw batch material composition.

This composition was extruded through an extrusion die to obtain a multi-channel body in which the cross-sectional shape of openings of the channels is as shown in FIG. 6. The thickness of the partition walls was 0.4 mm, the diameter corresponding to the channels was 3 mm and the distance of the continuous connecting passage surrounding the channels was 1 mm.

Then, a cordierite paste was injected only to an end face corresponding to a side face of passages excluding the channels among the end face where the channels of the shaped body open, to a depth of 1 mm to air-tightly seal the side face of the continuous passage. Openings 13, 13', 14 and 14' communicating with the continuous passages surrounding the channels were provided at side faces Y, Y', Z and Z' as shown in FIGS. 4 and 5.

The thus formed shaped body was fired in an electric furnace at 1,400° C. for 5 hours to obtain a multi-channel body of the present invention.

A heat exchange was effected by using this multi-channel body as a heat exchanger and feeding a fired gas at 800° C. as a hot fluid and air at 150° C. as a cool fluid and the heat exchanging effectiveness was determined.

Figure 2:
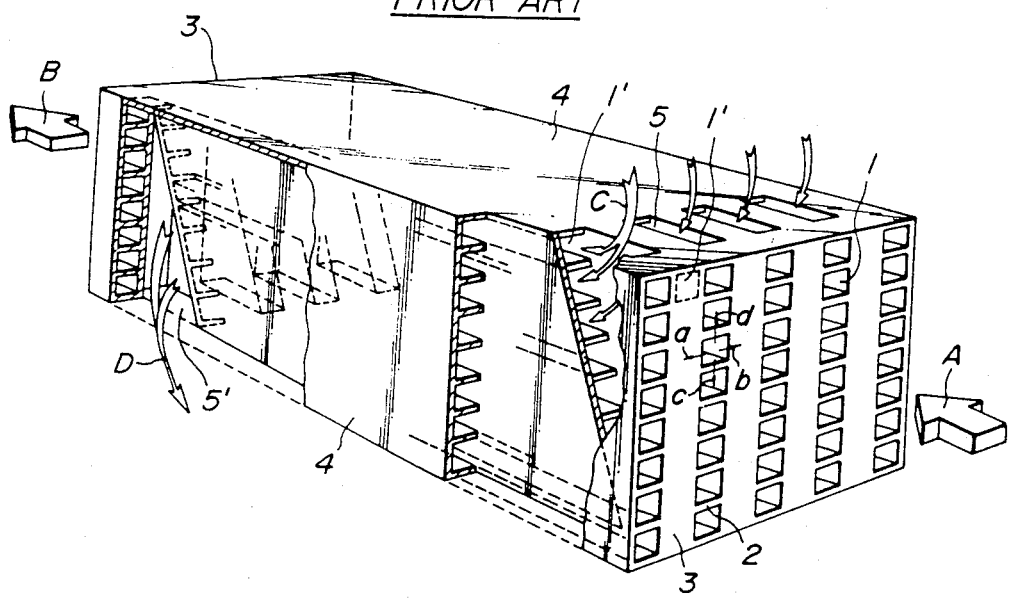
FIG. 2 is a partially broken schematic view of one embodiment when the prior honeycomb structured multi-channel body is used for a heat exchanger.
Figure 3:
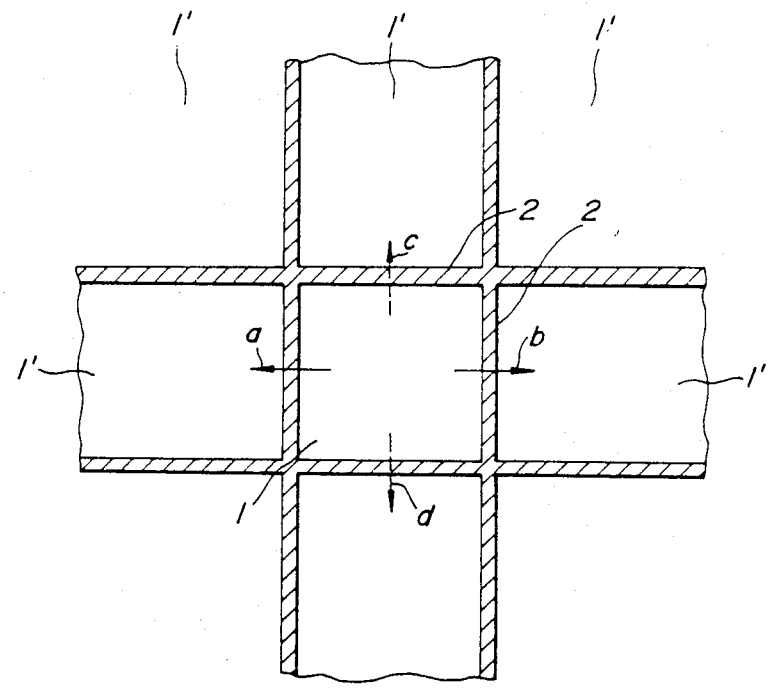
FIG. 3 is a diagrammatic view of a partially enlarged cross-section of the prior honeycomb structure.

For comparison, with respect to a heat exchanger having the prior structure described in Japanese Patent Laid Open Application No. 103,058/1977 as shown in FIG. 2, the heat exchanging effectiveness was determined and as the results, the multi-channel body of the present invention had a heat exchanging effectiveness of 2.3 times the prior art article.

EXAMPLE 2

Figure 13:
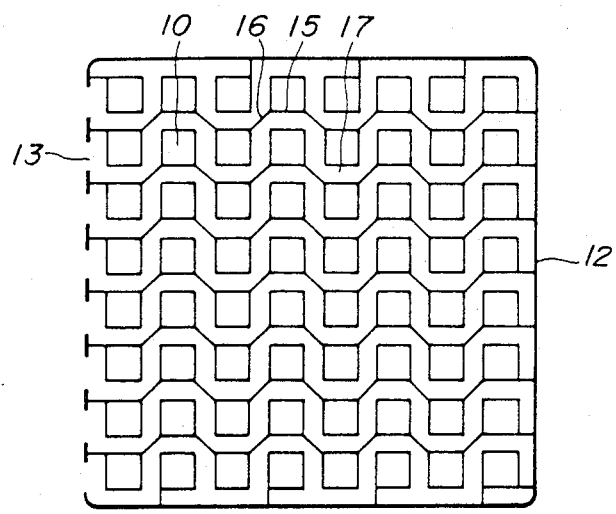
Figure 14:
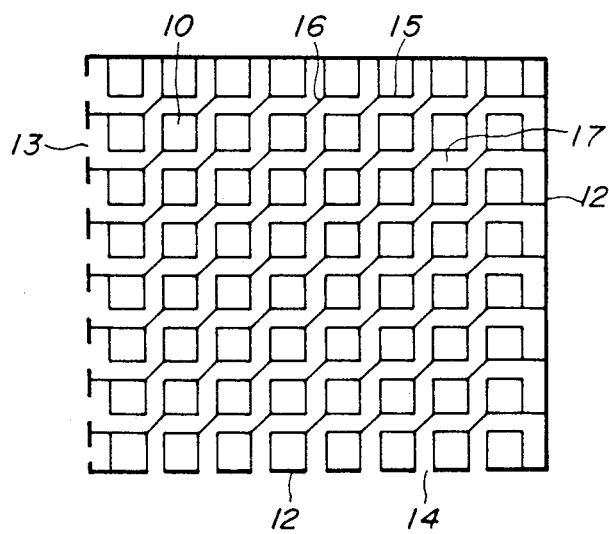

A multi-channel body of the present invention having the cross-sectional shape shown in FIG. 13 was prepared in the same manner as described in Example 1 by using an alumina raw material. An alumina paste was used for air-tightly sealing the proper portion and the diameter corresponding to the channel was 5 mm, the wall thickness was 1 mm, the width of the continuous passage was 2 mm, the size of the end face was $15 \times 15$ cm and the length was 50 cm.

With respect to a multi-channel body as shown in FIG. 2 produced from a prior honeycomb structure having a diameter corresponding to the channel of 5 mm and a wall thickness of 1 mm, a gas separating effectiveness of a starting gas of $CO 30\%-H_2 70\%$ was determined under the conditions of an inlet temperature of 200° C., an inlet pressure of 20 kg/cm$^2$ and a pressure difference of 5 kg/cm$^2$ for comparison.

As the results, in the prior multi-channel body, a purified gas of $CO 13\%-H_2 87\%$ was obtained in 110 Nm$^3$/hr, while in the multi-channel of the present invention, 320 Nm$^3$/hr was obtained and the separating effectiveness of the present invention was 2.8 times greater than the prior art article.

EXAMPLE 3

A multi-channel body of the present invention having the same shape and size as in Example 1 and a multi-channel body of a prior honeycomb structure shown by FIG. 2 were prepared by using mullite raw material and a thermal shock test was carried out.

These multi-channel bodies were rapidly heated from room temperature to 1,100° C. in 5 minutes by means of a propane burner and kept at 1,100° C. for 20 minutes and then quenched to room temperature in 5 minutes. This spalling test was repeated five times and the formation of cracks was observed. The multi-channel body of the prior structure was broken and the original shape was not maintained, while the multi-channel body of the present invention was not cracked at all and the thermal shock resistance was noticeably improved.

As mentioned above, in the multi-channel body of the present invention, the partition walls of a large number of independent channels are connected with the partition walls of the other independent adjacent channels by the connecting walls and the continuous channels are formed at the entire circumference of the channels, so that all the partition walls surrounding the channels are effectively utilized and therefore the contacting area between the passages wherein the different fluids flow, is considerably increased.

Accordingly, the multi-channel bodies of the present invention are particularly excellent in the heat exchanging effectiveness and the gas separating effectiveness and are high in the thermal shock resistance.

Thus, the multi-channel bodies of the present invention can be advantageously used, for example, for heat exchanger, gas separating membrane, filtrating device, cooler, permeating device, filter, various packages, and for reactors in which gas-solid reactions occur, liquid-solid reaction and the like, which are carried out in the channels in the multi-channel body, and are controlled by flowing a hot fluid in the continuous passage surrounding the channels whereby the temperature of the catalyst supported on an inner surface of the channels of the multi-channel body is controlled.

Moreover, the multi-channel bodies of the present invention can be used for gas-liquid reaction system, for example, by flowing a liquid in one passage to permeate out the liquid on the partition wall and flowing a gas in another passage, whereby said gas is reacted with the permeated liquid, gas-gas reaction system, liquid-liquid reaction system or gas-liquid-solid reaction system. Furthermore, if a heating element, such as PTCR honeycomb heater has the structure of the multi-channel of the present invention, the heater capable of controlling the temperature at a high precision can be obtained by adjusting the fluid in the continuous passage surrounding the channels and the multi-channel bodies of the present invention are very commercially useful.

What is claimed is:

1. A multi-channel body comprising:
    an outer wall;
    a plurality of parallelly situated independent channels located inside of said outer wall, each of said independent channels being defined by partition walls having an inner surface and an outer surface and each parallelly situated independent channel does not share any portion of any partition wall with any other parallelly situated independent channel, whereby a first fluid passes through said parallelly situated independent channels in contact with inner surfaces of said partition walls;
    a plurality of connecting walls for connecting said parallelly situated independent channels and at least one connecting wall communicates with one partition wall of each independent channel, whereby a plurality of continuous passages are formed throughout said multi-channel body around said plurality of parallelly situated independent channels, said continuous passages being defined by outer surfaces of said partition walls, said connecting walls and said outer wall of the multi-channel body, thereby permitting a second fluid to pass through said plurality of continuous passages in contact with outer surfaces of said partition walls;
    at least one inlet in said outer wall of the multi-channel body communicating with said continuous passages to permit said second fluid to enter said continuous passages; and
    at least one outlet in said outer wall of the multi-channel body communicating with said continuous passages to permit said second fluid to exit said continuous passages.

2. The multi-channel body as claimed in claim 1, wherein one side of openings in said parallelly situated independent channels are integrally and air-tightly sealed with the outer wall.

3. The multi-channel body as claimed in claim 1, wherein the connecting walls are connected symmetrically with respect to each other and with respect to the parallelly situated independent channels.

4. The multi-channel body as claimed in claim 1, wherein entrances and exits for the parallelly situated independent channels and the continuous passages are located on mutually exclusive surfaces of the outer wall.

5. The multi-channel body as claimed in claim 1, wherein the partition walls, connecting walls and outer wall forming the multi-channel body are formed in a monolithic structure consisting essentially of a material selected from the group of materials consisting of an inorganic material and a metallic material.

6. The multi-channel body as claimed in claim 1, wherein a cross-sectional shape of the channels is selected from the group of cross-sectional shapes consisting of circular, ovular, triangular, pentagonal and hexagonal.

7. The multi-channel body as claimed in claim 1, wherein said first and said second fluids are not permitted to mix because of air-tightly sealing said plurality of parallelly situated independent channels from said plurality of continuous passages.

* * * * *